(12) United States Patent
Xie

(10) Patent No.: US 7,178,917 B2
(45) Date of Patent: *Feb. 20, 2007

(54) SPECTACLE SET WITH WELDINGLESS BRIDGE

(76) Inventor: Yiling Xie, 900 Arcadia Ave., #8, Arcadia, CA (US) 91007

( * ) Notice: Subject to any disclaimer, the term of this patent is extended or adjusted under 35 U.S.C. 154(b) by 124 days.

This patent is subject to a terminal disclaimer.

(21) Appl. No.: 11/063,521

(22) Filed: Feb. 22, 2005

(65) Prior Publication Data

US 2005/0157252 A1    Jul. 21, 2005

Related U.S. Application Data

(62) Division of application No. 10/761,624, filed on Jan. 20, 2004, now Pat. No. 7,011,407.

(51) Int. Cl.
*G02C 7/08* (2006.01)
(52) U.S. Cl. ............................ 351/57; 351/47; 351/124
(58) Field of Classification Search ................ 351/41, 351/47, 48, 57, 58, 124–135
See application file for complete search history.

(56) References Cited

U.S. PATENT DOCUMENTS 5,546,140 A * 8/1996 Underwood ................. 351/47

7,011,407 B2 * 3/2006 Xie ............................. 351/124
7,048,373 B2 * 5/2006 Yamaguchi et al. ........ 351/110

* cited by examiner

*Primary Examiner*—Huy K. Mai
(74) *Attorney, Agent, or Firm*—Raymond Y. Chan; David and Raymond Patent Group

(57) ABSTRACT

A spectacle set includes a primary spectacle and a detachable shelter frame detachably mounting in front of the primary spectacle. The primary spectacle includes a weldingless bridge including a bridge body having two side portions, two lens holding arms integrally and sidewardly extended from the two side portions of the bridge body to couple with two inner sides of the lenses respectively, two nose supporting arms integrally and rearwardly extended from the two side portions of the bridge body, and two nose pieces securely coupling with two free ends of the nose supporting arms respectively. The detachable shelter frame includes a shelter bridge extended between two inner sides of two shelter lenses and a mounting arrangement rearwardly extended from the shelter bridge to detachably mount on the weldingless bridge so as to detachably mount the detachable shelter frame in front of the primary spectacle.

16 Claims, 13 Drawing Sheets

SPECTACLE SET WITH WELDINGLESS BRIDGE

CROSS REFERENCE OF RELATED APPLICATION

This is a divisional application that claims the benefit of priority under 35 U.S.C.§119 to a non-provisional application, application Ser. No. 10/761,624, filed Jan. 20, 2004 now U.S. Pat. No. 7,011,407.

BACKGROUND OF THE PRESENT INVENTION

1. Field of Invention

The present invention relates to a spectacle set, and more particularly to a spectacle set with a weldingless bridge, which is adapted to enhance the structural strengthen of the bridge between two lenses of the primary spectacle so as to rigidly support the detachable shelter frame in front of the primary spectacle.

2. Description of Related Arts

A conventional spectacle usually comprises two lenses and a spectacle frame for supporting the lenses in position, wherein the spectacle frame comprises two side extensions rearwardly extended from two outer sides of the lenses respectively for wearing onto the ears of the user, and a bridge extended between two inner sides of the lenses for supporting the lenses at a predetermined position above the user's nose.

Specifically, the bridge usually comprises a connecting link connecting between two inner sides of the lenses, two nose supporting arms rearwardly extended from the connecting link, and a pair of nose pieces provided on rear ends of the supporting arms respectively for supporting the lenses on the user's nose.

As a matter of fact, the two nose supporting arms are usually welded on the reinforcing frames respectively, wherein the nose supporting arms are adapted to be slightly bended so as to fit the spectacle frame with respect to a profile of the user's face for achieving the maximum comfort for the user. However, due to the structural configuration of the spectacle frame, the nose supporting arms are very weak that they may easy to break when excessive force is carelessly applied.

In addition, apart from regular spectacles, people usually prefer to wear some sorts of accessories, such as a shelter frame, for shading sunlight while, say, driving.

A conventional shelter frame, such as a clip-on sunglasses, usually comprises a plurality of clipping claws for detachably mounting on the primary spectacle frame so that the user does thereof does not need to purchase an extra set of sunglasses. For such of shelter frame, there exist well-known disadvantages of easily scratching the primary spectacle frame and inconvenient wearing of the shelter frame to the primary spectacle frame.

Therefore, the shelter frame which utilizes magnetic forces for detachably attaching to the primary spectacle frame has been developed in order to overcome the above-mentioned disadvantages. Notwithstanding this kind of spectacle sets have significantly overcome the problem of unnecessary scratching, it should be admitted that the 'magnetic forces' are far from perfect in that a plurality of binding magnets have to be mounted on the primary spectacle frame as well as the shelter frame respectively. Therefore, the structure of the primary spectacle frame must be altered to incorporate with the binding magnets.

Furthermore, the wearer has to align the two binding magnets in order to attach the shelter frame onto the primary spectacle frame. For example, when the user is driving on a road, this attaching process is very demanding since the driver has also to take care of the vehicle while wearing the shelter frame. Moreover, the security of attachment largely depends on the binding force (i.e. quality) of the binding magnets utilized so that it may be the case that the shelter frame is not securely attached on the spectacle frame and falls off therefrom.

As a result, magnets are obviously not the panacea for conventional spectacle sets and conventional shelter frame. Nevertheless, magnets present a non-destructive type of attaching method by which the shelter frame is capable of attaching on a spectacle set, though inconveniently.

A logical development of the above conventional shelter frame is a shelter frame wherein the shelter frame comprises a plurality of clipping arms arranged to clip on the bridge of the primary spectacle frame. Presumably, this kind of shelter frame should have effectively overcome the above-mentioned discrepancies for the conventional spectacles and the conventional shelter frames. However, in order to securely attach the shelter frame in front of the primary spectacle frame, the wearer must apply a clipping force on the bridge of the primary spectacle frame through the clipping arms. As it is mentioned above, the clipping force may strong enough to break the nose supporting arms. Especially when the wearer may merely use one hand to attach or detach the shelter frame during exercising or driving, he or she may unintentionally apply a larger clipping force on the bridge of the primary spectacle frame. In other words, the bridge is one of the major components of the primary spectacle frame not only to support the lenses in position but also to support the shelter frame once the shelter frame is attached in front of the primary spectacle frame.

SUMMARY OF THE PRESENT INVENTION

A main object of the present invention is to provide a spectacle set, which comprises a weldingless bridge not only substantially supporting two lenses of a primary spectacle but also rigidly supporting a detachable shelter frame when the detachable shelter frame is mounted in front of the primary spectacle.

Another object of the present invention is to provide a spectacle set, wherein the nose supporting arms are integrally extended from the bridge body to form the weldingless bridge in one piece integral body such that the weldingless bridge is capable of substantially withstanding greater force, such as clipping force, exerted on the primary spectacle.

Another object of the present invention is to provide a spectacle set, wherein the weldingless bridge is configured to fit both the primary spectacle and the detachable spectacle frame for supporting the lenses in position. Therefore, the cost of the spectacle set can be significantly reduced by incorporating the weldingless bridge with both the primary spectacle and the detachable spectacle frame.

Another object of the present invention is to provide a spectacle set, wherein the manufacturing process of the weldingless bridge is simple by forming an integral elongated member so as to minimize the manufacturing cost of the spectacle set of the present invention incorporating with the weldingless bridge.

Another object of the present invention is to provide a spectacle set, wherein the wearer may merely use one hand to attach or detach the shelter frame during exercising or driving without distorting the weldingless bridge of the primary spectacle.

Another object of the present invention is to provide a spectacle set, wherein no expensive or complicated mechanical structure is required to employ in the present invention in order to achieve the above mentioned objects. Therefore, the present invention successfully provides an economic and efficient solution not only for providing a weldingless bridge to support the lenses of the primary spectacle but also for supporting the detachable shelter frame in front of the primary spectacle through the weldingless bridge.

Accordingly, in order to accomplish the above objects, the present invention provides a spectacle set comprising a primary spectacle and a detachable shelter frame detachably mounting in front of the primary spectacle.

The primary spectacle comprises two lenses, two side extensions rearwardly extended from two outer sides of the two lenses respectively, and a weldingless bridge which comprises a bridge body having two side portions, two lens holding arms integrally and sidewardly extended from the two side portions of the bridge body to couple with two inner sides of the lenses respectively, two nose supporting arms integrally and rearwardly extended from the two side portions of the bridge body, and two nose pieces securely coupling with two free ends of the nose supporting arms respectively.

The detachable shelter frame comprises two shelter lenses, a shelter bridge extended between two inner sides of the shelter lenses, and a mounting arrangement rearwardly extended from the shelter bridge to detachably mount on the weldingless bridge so as to detachably mount the detachable shelter frame in front of the primary spectacle.

These and other objectives, features, and advantages of the present invention will become apparent from the following detailed description, the accompanying drawings, and the appended claims.

DETAILED DESCRIPTION OF THE PREFERRED EMBODIMENT

Figure 1:
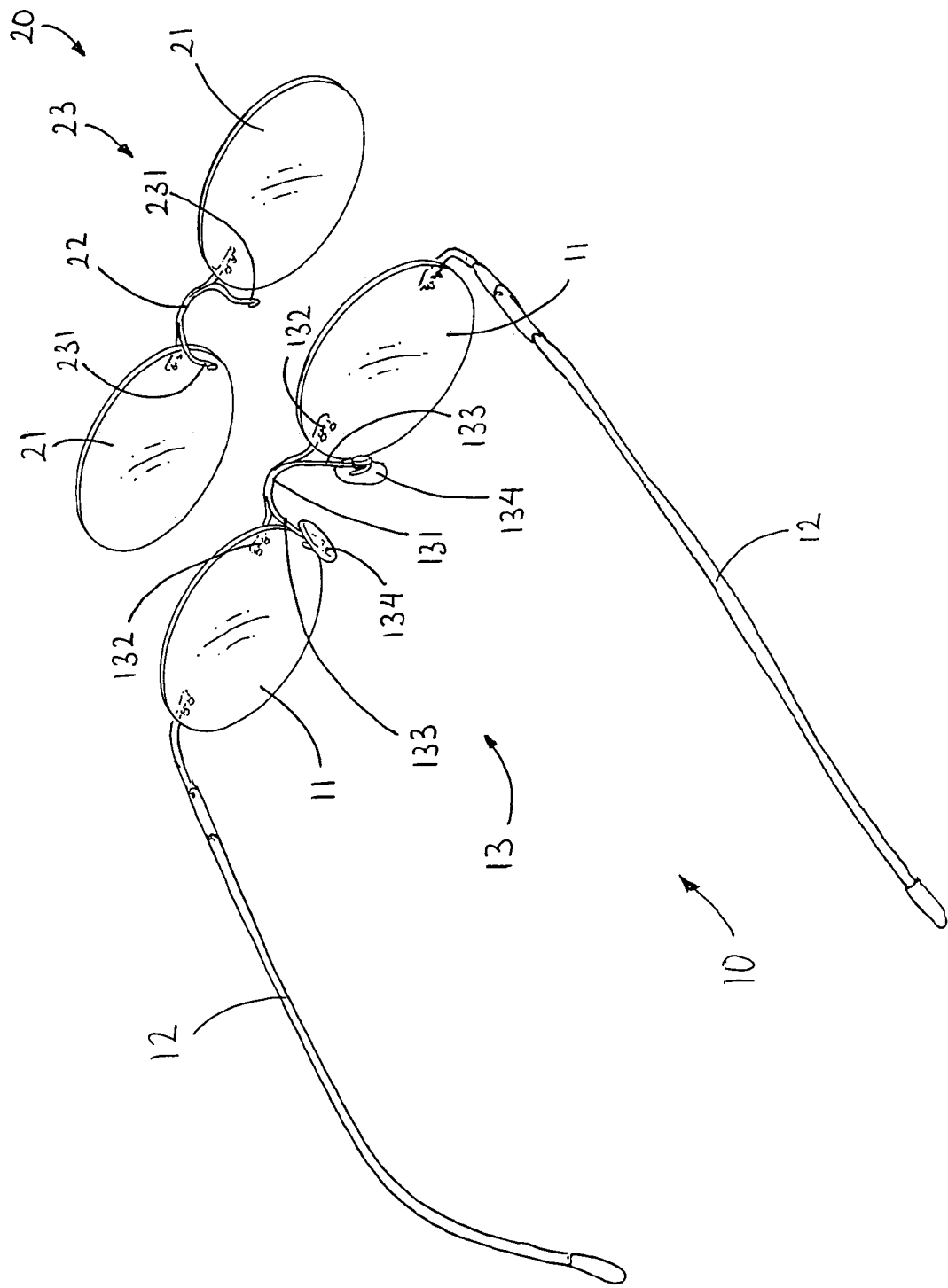
FIG. 1 is a perspective view of a spectacle set according to a preferred embodiment of the present invention.
Figure 6:
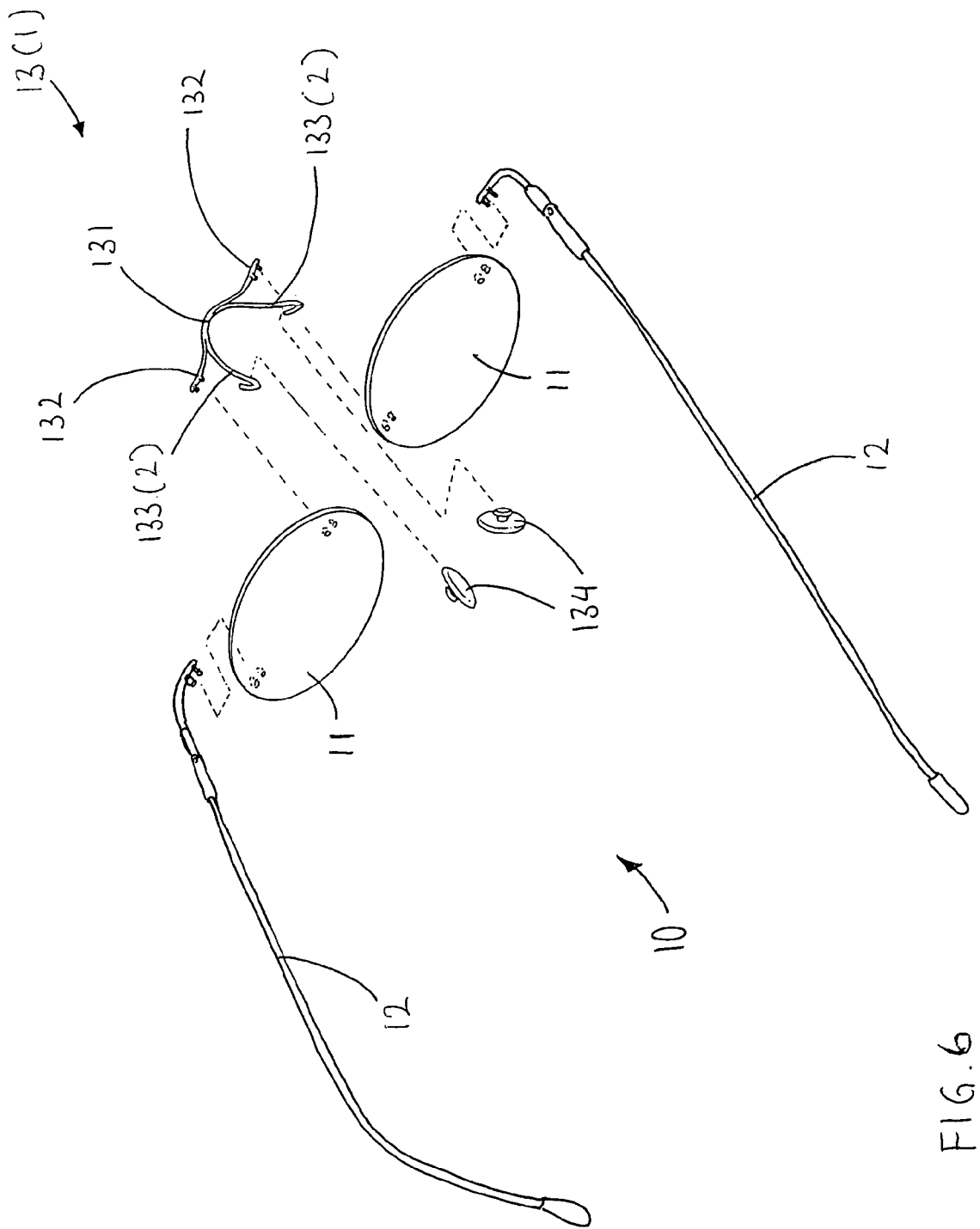
FIG. 6 is an exploded perspective view of the primary spectacle according to the above preferred embodiment of the present invention.

Referring to FIGS. 1 and 6 of the drawings, a spectacle set according to a preferred embodiment of the present invention is illustrated, wherein the spectacle set comprises two lenses 11 and a weldingless bridge 1, wherein the welding bridge 1 comprises a bridge body 131 having two lens holding arms 132 coupling with two inner sides of the lenses 11 respectively and two functioning arms 2 integrally and rearwardly extended from the bridge body 131.

According to the preferred embodiment, the spectacle set further comprises two side extensions 12 rearwardly extended from two outer sides of the two lenses 11 respectively and two nose pieces 134 securely coupling with two free ends of the functioning arms 130 respectively, wherein the two functioning arms 2 are respectively formed as two nose supporting arms 133 to support the nose pieces 134 in position such that the weldingless bridge 1 is formed as a primary bridge 13 to support the lenses 11 in position so as to form a primary spectacle 10, as shown in FIG. 6.

Figure 7:
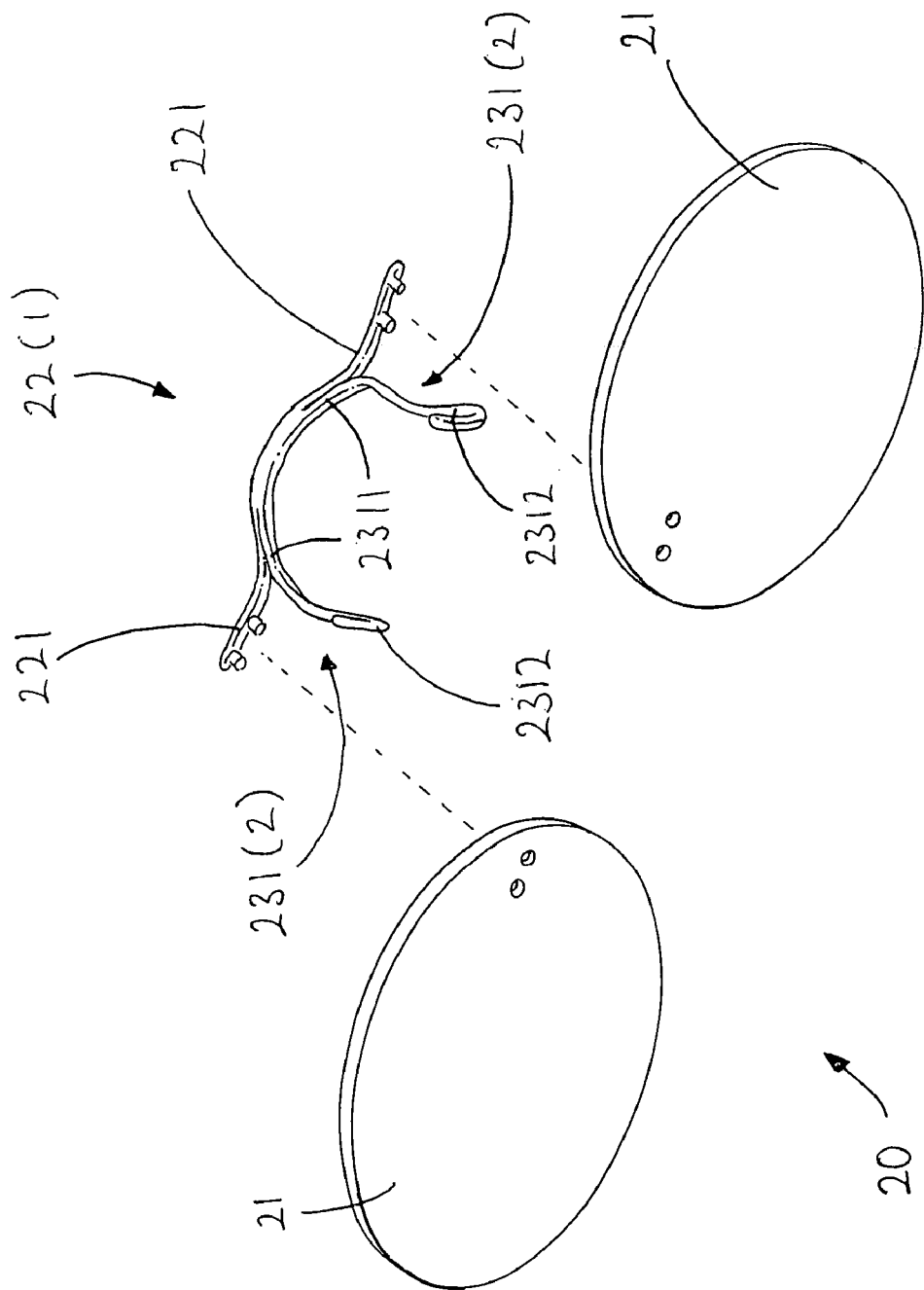
FIG. 7 is an exploded perspective view of a shelter frame according to the above preferred embodiment of the present invention.

The spectacle set further comprises a detachable shelter frame 20 detachably mounting in front of the primary spectacle 10. As shown in FIG. 7, the detachable shelter frame 20 comprises two shelter lenses 21, a shelter bridge 22 extended between two inner sides of the shelter lenses 21, and a mounting arrangement 23 rearwardly extended from the shelter bridge 22 to detachably mount on the primary spectacle 10 so as to detachably mount the detachable shelter frame 20 in front of the primary spectacle 10.

According to the preferred embodiment, the primary spectacle 10 can be constructed as a convention spectacle frame to have a pair of lens rim encircling the two lenses 11 wherein the two lenses holding arms 132 of the weldingless bridge 13 are coupled with the lens rim to hold the lenses 11 in position. The primary spectacle 10 can also be constructed as a rimless frame, as shown in FIGS. 1 and 6, wherein the two lenses holding arms 132 are directly fastened to the inner sides of the lenses 11 so as to support the lenses 11 in position. It is worth to mention that the primary bridge 13 is highly preferred to incorporate with the rimless frame of the primary spectacle 10 due to the structural configuration of the weldingless bridge 1.

The primary bridge 13 is formed as a one piece elongated bridge body 131, having a H-shaped cross section, wherein the bridge body 131 has two longitudinal grooves formed along two longitudinal side portions respectively to form two elongated arms at each side portion of the bridge body 131. Two corresponding elongated arms of the elongated bridge body 131 are formed as two lens holding arms 132 to couple with the inner sides of the lenses 11 respectively while another two corresponding elongated arms of the bridge body 131 are rearwardly folded to form as two nose supporting arms 133 to couple with the nose pieces 134 respectively.

Figure 2:
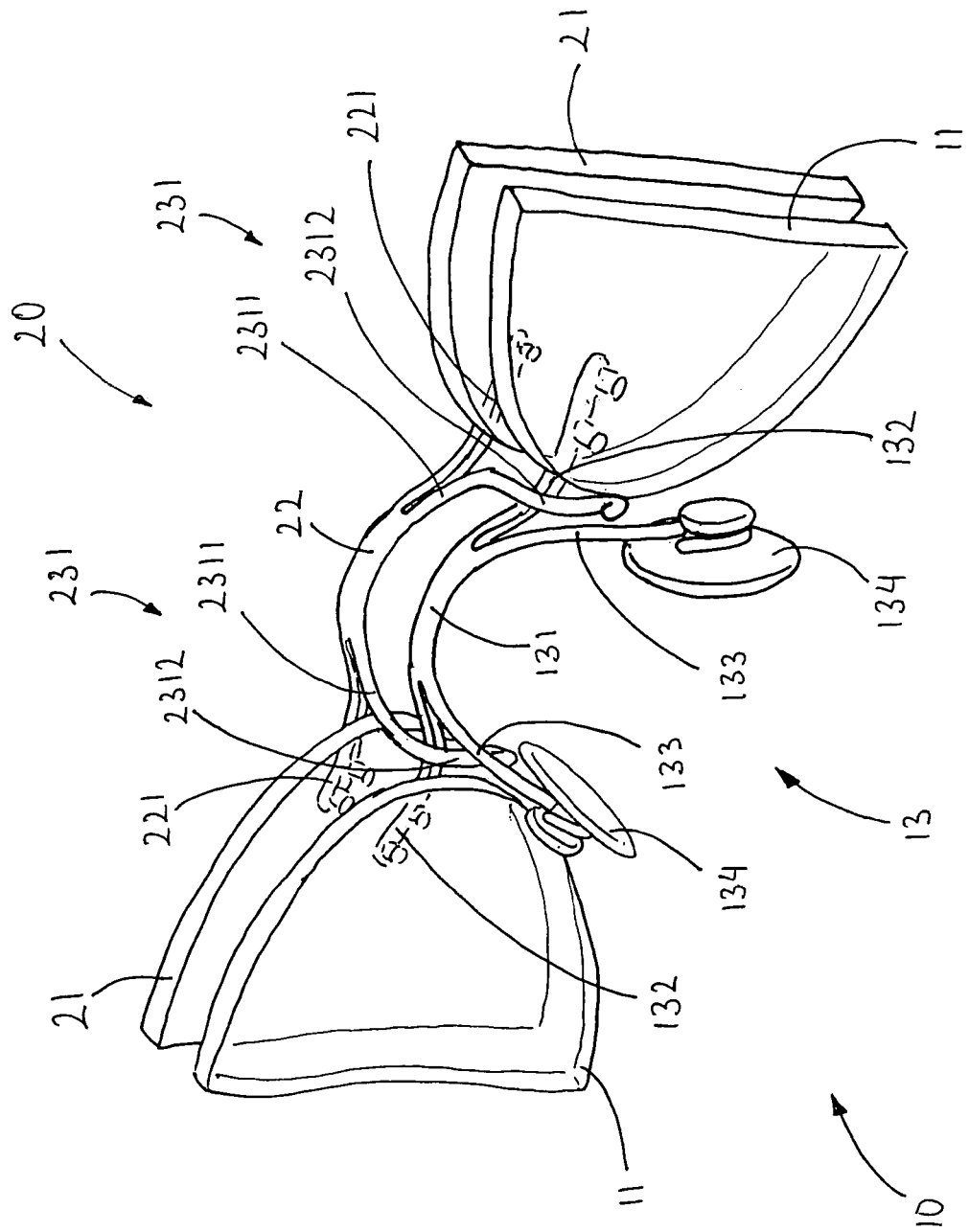
FIG. 2 is a perspective view of a weldingless bridge of primary spectacle of the spectacle set according to the above preferred embodiment of the present invention, illustrating the detachable shelter frame detachably mounting in front of the primary spectacle.

In other words, each of the lens holding arms 132 is spaced apart from the corresponding nose supporting arm 133 when the lens holding arm 132 and the nose supporting arm 133 are integrally extended from the respective side portion of the bridge body 131, as shown in FIG. 2.

Figure 4:
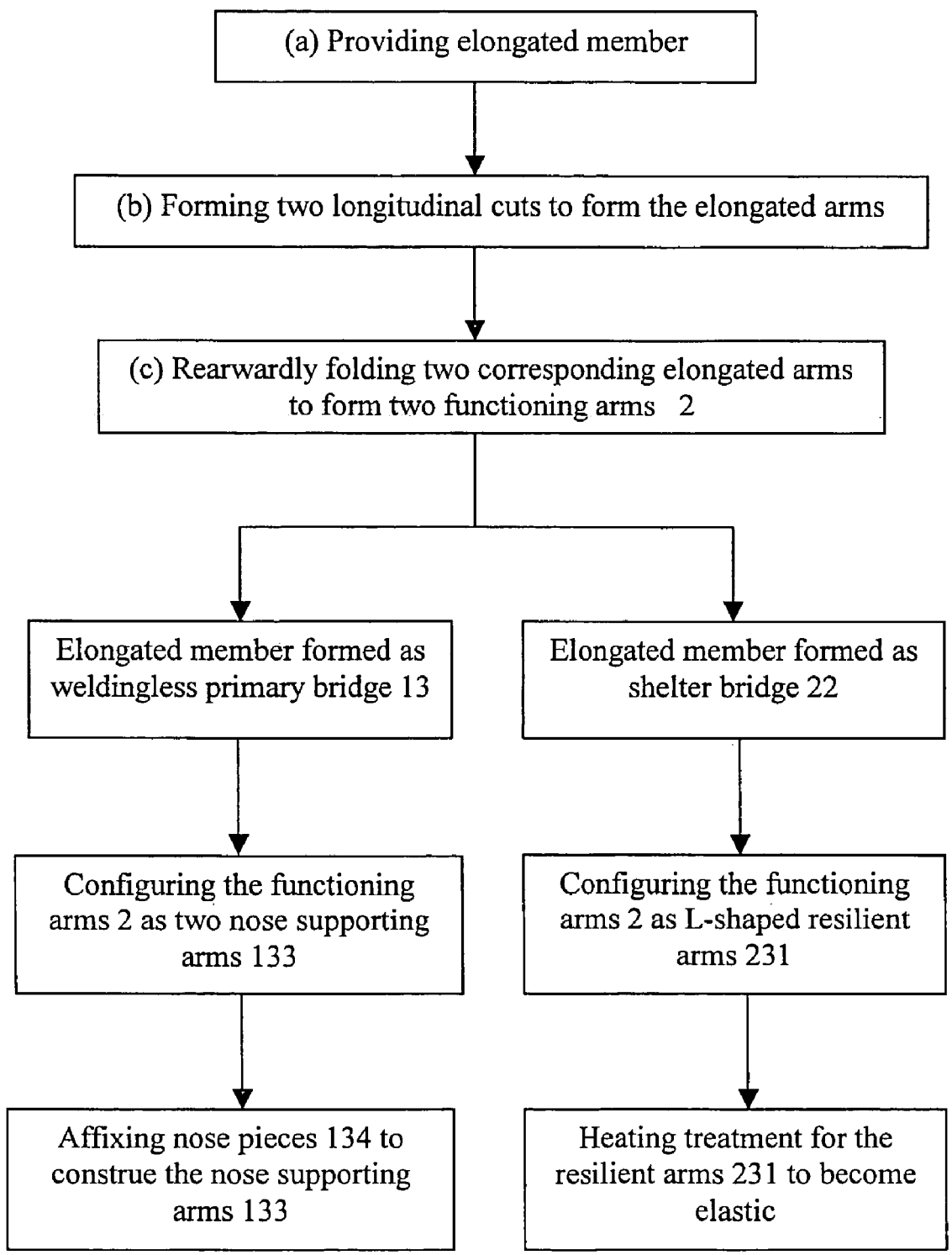
FIG. 4 is a flow diagram of a method of manufacturing a weldingless bridge according to the above preferred embodiment of the present invention.
Figure 5:
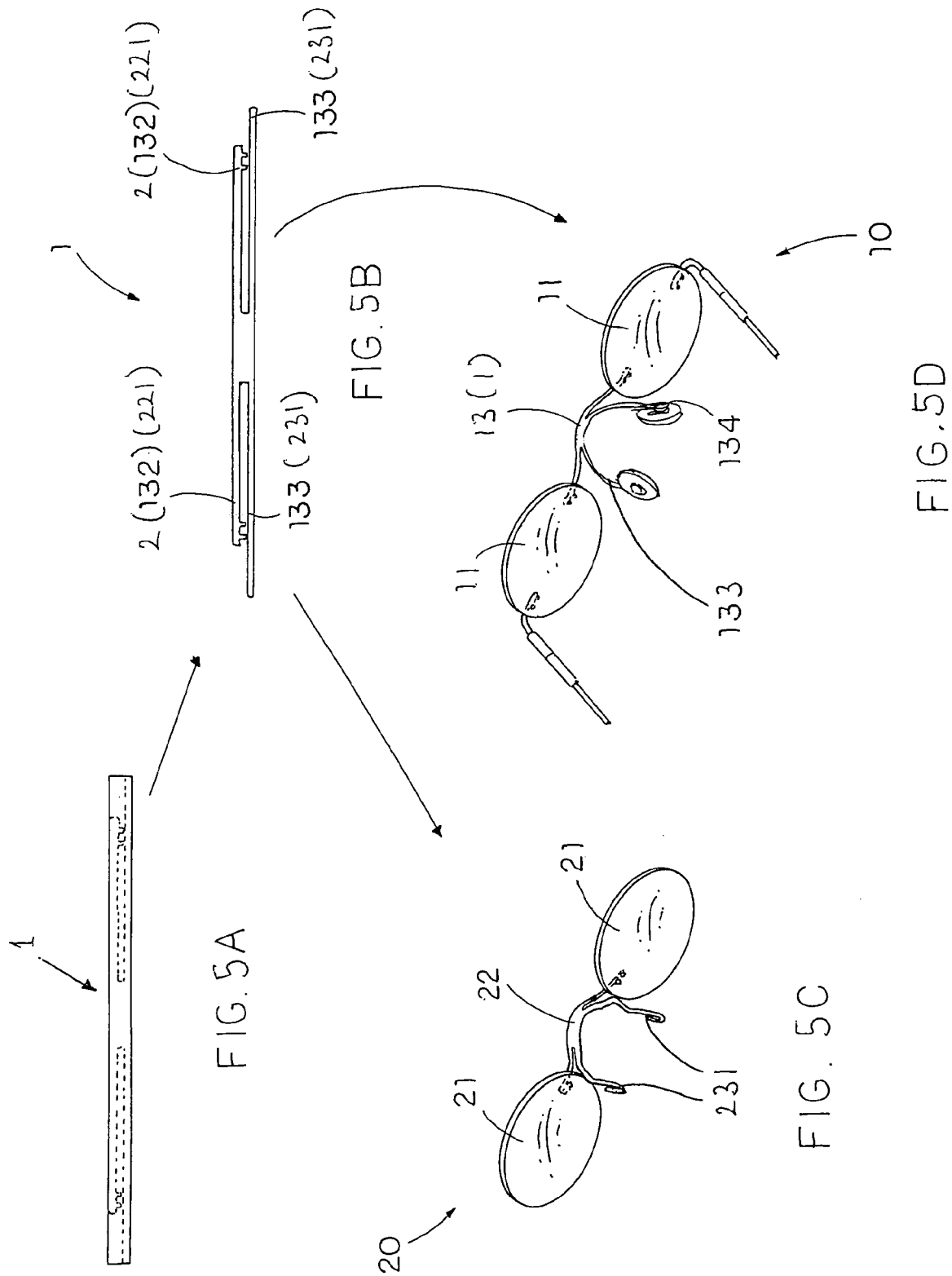
FIG. 5A to FIG. 5D are schematic diagrams for the method of manufacturing the weldingless bridge according to the above preferred embodiment of the present invention.

As shown in FIGS. 4 and 5, the manufacturing process of the weldingless bridge 1 of the spectacle set comprises the following steps.

(1) Provide an elongated member as the elongated bridge body 131 having two longitudinal end portions.

(2) Form two longitudinal grooves on the end portions of the bridge body 131 respectively by linear cutting to form two spacedly apart elongated arms at each of the end portions of the bridge body 131.

(3) Rearwardly fold two corresponding elongated arms as two functioning arms 2 respectively while another two corresponding elongated arms are formed as two lens holding arms 132 to securely mount at two inner sides of the lenses 11 respectively.

Referring to FIG. 5B, in step (b) above, the elongated arms are preferably cut from the elongated member by linear cutting using regular digital wire cut machine which utilizes extremely high electric voltage for cutting materials precisely and quickly. In other words, the elongated arms can be formed in a wide variety of predetermined irregular shapes wherein each of the elongated arms is capable of facilitating different functions by the virtue of their different shapes.

Moreover, the two longitudinal grooves are formed by two longitudinal cuts on the elongated side portions of the elongated member respectively so as to divide each of the elongated end portions for forming the two elongated arms.

Alternatively, the elongated arms may be formed by conventional molding method for forming the weldingless bridge 14.

Accordingly, the elongated member preferably has a length determined by a distance between the two lenses 11 of the primary spectacle 10 so that the weldingless bridge 1 manufactured from it is capable of connecting between the two lenses 11. Moreover, the elongated member forms the central bridge body 131 wherein the two longitudinal end portions are sidewardly and integrally extended in two opposite directions respectively from the central bridge body 131.

Referring to FIG. 5C of the drawings, in step (c) above, two corresponding elongated arms are rearwardly folded to form two functioning arms 2 which are adapted to support the spectacle onto the user's face. On the other hand, the remaining two corresponding elongated arms are formed as two lenses mounting arms 132 wherein two outer ends of the two lenses mounting arms 132 are securely mounted to two inner sides of the two lenses 11 respectively so as to connect the two lenses 11 in a spacedly apart manner for the primary spectacle 10.

As a result, it is worth appreciating that the central bridge portion of the elongated member will become the central bridge body 131 of the resulting weldingless primary bridge 13.

Each of the nose pieces 134 has an outer supporting surface formed thereon and adapted for inclinedly biasing against the nostril of the user so as to support the primary spectacle 10 on the user's face. The nose pieces 134 are preferably made of flexible materials so as to maximize the comfort to the user on wearing the primary spectacle 10.

The primary bridge 13 of the primary spectacle 10 is made of rigid but lightweight material such as metal that the two functioning arms 2 are adapted to be bent to fold the nose supporting arms 133 in a predetermined shape. Accordingly, since the primary bridge 13 is formed in one piece, no substantial welding is required to connect the nose supporting arms 133 to the bridge body 131 and/or the lens holding arms 132. Therefore, the weldingless bridge 1 provides durable structural configuration that is capable of withstanding a greater force exerted on the primary bridge 13, so as to prevent the primary spectacle 10 from distortion, especially when an external force is applied on the weldingless bridge 13.

Figure 3:
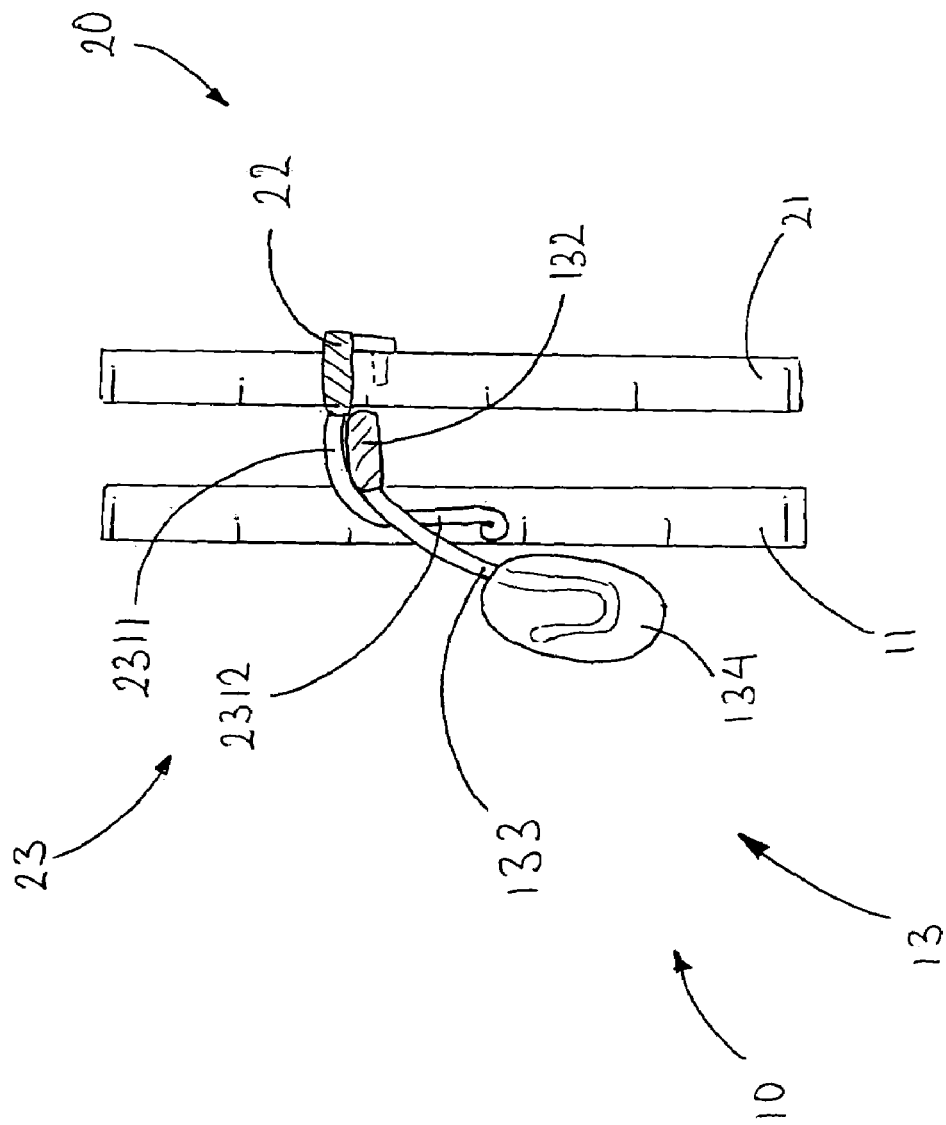
FIG. 3 is a sectional view of the spectacle set according to the above preferred embodiment of the present invention, illustrating the detachable shelter frame detachably mounting in front of the primary spectacle.

As shown in FIGS. 1 through 3, the detachable shelter frame 20 is detachably mounted in front of the primary spectacle 10 wherein the shelter lenses 21 are overlapped in front of the lenses 11 of the primary spectacle 10 respectively. The shelter bridge 22 has two shelter lens holding arms 221 coupling with the two inner sides of the shelter lenses 21 so as to retain the shelter lenses 22 in position. In addition, the two shelter lens holding arms 221 are fastened to the inner sides of the shelter lenses 21 respectively to form a rimless frame of the detachable shelter spectacle 20, as shown in FIG. 7.

According to the preferred embodiment, the mounting arrangement 23 comprises two resilient arms 231 spacedly and rearwardly extended from the shelter bridge 22 to engage with the primary spectacle 10. The resilient arms 231 are extended to ride on the lens holding arms 132 of the primary bridge 13 respectively so as to detachably mount the detachable shelter frame 20 in front of the primary spectacle 10, as shown in FIGS. 2 and 3.

According to the preferred embodiment, the shelter bridge 22 is also constructed by the weldingless bridge 1 wherein the shelter bridge 22 is formed in one integral body that the shelter lens holding arms 221 and the resilient arms 231 are spacedly and sidewardly extended to form the shelter bridge 22 having a H-shaped cross section, wherein said resilient arms 231 are rearwardly bent to ride on the primary bridge 13 of the primary spectacle 10. The functioning arms 2 of the weldingless bridge 1 are formed as the resilient arms 231 of the detachable shelter frame 20.

It is worth to mention that the two lenses 11 are respectively embodied as the two shelter lenses 21 and the functioning arms 2 are formed as the two resilient arms 231 rearwardly extended from the bridge body of the shelter bridge 22 to form the detachable shelter frame 20 for detachably mounting in front of the primary spectacle 10.

Accordingly, heat treatment is applied on the weldingless bridge 1 to form the shelter bridge 22 such that the two functioning arms 2 are given a rigid but elastic ability to not only securely support the detachable shelter frame 20 in front of the primary spectacle 10 but also apply an urging force against the primary bridge 13 to securely hold the detachable shelter frame 20 in front of the primary spectacle 10. Therefore, the manufacturing process of the weldingless bridge 1 can be simplified to reduce the manufacturing cost of the primary spectacle 10 while the weldingless bridge 13 provides a strong and rigid structure to support the lenses 11 in position.

In other words, the manufacturing method of the shelter bridge 22 is the same as that of the primary bridge 13 by using the weldingless bridge 1, as shown in FIGS. 4 and 5. Therefore, the shelter bridge 22, also having a H-shaped cross section, has two longitudinal grooves formed along two longitudinal side portions respectively to form two elongated arms at each side portion of the shelter bridge 22, wherein two corresponding elongated arms of the shelter bridge are formed as said two shelter lens holding arms 221 to couple with the inner sides of the shelter lenses 21 respectively while another two corresponding elongated arms of the shelter bridge 22 are rearwardly folded to form as the two resilient arms 231 respectively detachably riding on the primary bridge 13. In other words, the shelter bridge 22 not only constructs as a connection bridge for the detachable shelter frame 20 but also forms as a bridge clip for the detachable shelter frame 20 to mount in front of the primary spectacle 10.

As shown in FIG. 3, each of the resilient arms 231, having a L-shaped, has a riding portion 2311 integrally and rearwardly extended from the shelter bridge 22 to ride on the respective lens holding arm 132 of the primary bridge 13 and a holding portion 2312 downwardly extended from the riding portion 2311 to engage with a rear side of the respective lens holding arm 132 of the primary bridge 13 so as to securely hold the detachable shelter frame 20 in front of the primary spectacle 10.

Accordingly, the holding portion 2312 of each of the resilient arms 231 has a guiding tip 2313 formed at a bottom end to guide the respective resilient arm 231 for slidably engaging with the primary bridge 13 of the primary spectacle 10. As shown in FIG. 3, the holding portion 2312 of each of the resilient arms 231 is bent to form a U-shaped loop body having a round bottom end as the guiding tip 2312 to slidably guide the engagement between the resilient arm 231 and the primary bridge 13 of the primary spectacle 10. Alternatively, the holding portion 2313 of each of the resilient arms 231 is bent to have a S-shape to enhance the sliding engagement between resilient arm 231 and the primary bridge 13 of the primary spectacle 10.

It is worth to mention that the primary bridge 13 of the primary spectacle 10, which is constructed by the weldingless bridge 1, fits for any kind of detachable shelter frame to mount in front of the primary spectacle 10, wherein the primary bridge 13 is rigid enough to support any detachable shelter frame in front of the primary spectacle 10.

Likewise, the shelter bridge 22 of the detachable shelter frame 20, which is constructed by the weldingless bridge 1, fits for any kind of primary spectacle to mount the detachable shelter frame 20 in front of the primary spectacle 10, wherein the resilient arms 231 are rigid but elastic enough to securely hold the detachable shelter frame 20 in front of the primary spectacle 10. In other words, the weldingless structure of the bridge configuration can be employed with both the primary spectacle 10 and the detachable shelter frame 20 to enhance the strength of the primary spectacle 10 and the detachable shelter frame 20.

In order to attach the detachable shelter frame 20 in front of the primary spectacle 10, the wearer may merely use one hand to hold the shelter bridge 22 to align with the primary bridge 13 of the primary spectacle 10. Then, the wearer is able to align the resilient arms 231 with the lens holding arms 132 respectively such that by applying a clipping force on the shelter bridge 22, the resilient arms 231 are slidably engaged with the lenses holding arms 132 respectively so as securely mount the detachable shelter frame 20 to the primary spectacle 10.

For detaching the detachable shelter frame 20 from the primary spectacle 10, the wearer is able to apply a pulling force on the shelter bridge 22 to pull the resilient arms 231 away from the lens holding arms 132 respectively such that the detachable shelter frame 20 is detached from the primary spectacle 10.

It is worth to mention that the primary bridge 13 of the primary spectacle 10 is formed as a one piece rigid member, such that when the wearer applies the clipping force or the pulling force as the external force on the primary bridge 13, the primary bridge 13 is capable of withstanding the external force so as to prevent the primary bridge 13 from being distorted and the nose supporting arms 133 from being broken. In other words, the primary bridge 13 is strong enough not only to rigidly support the lenses 11 in position but also to substantially support the detachable shelter frame 20.

Figure 8:
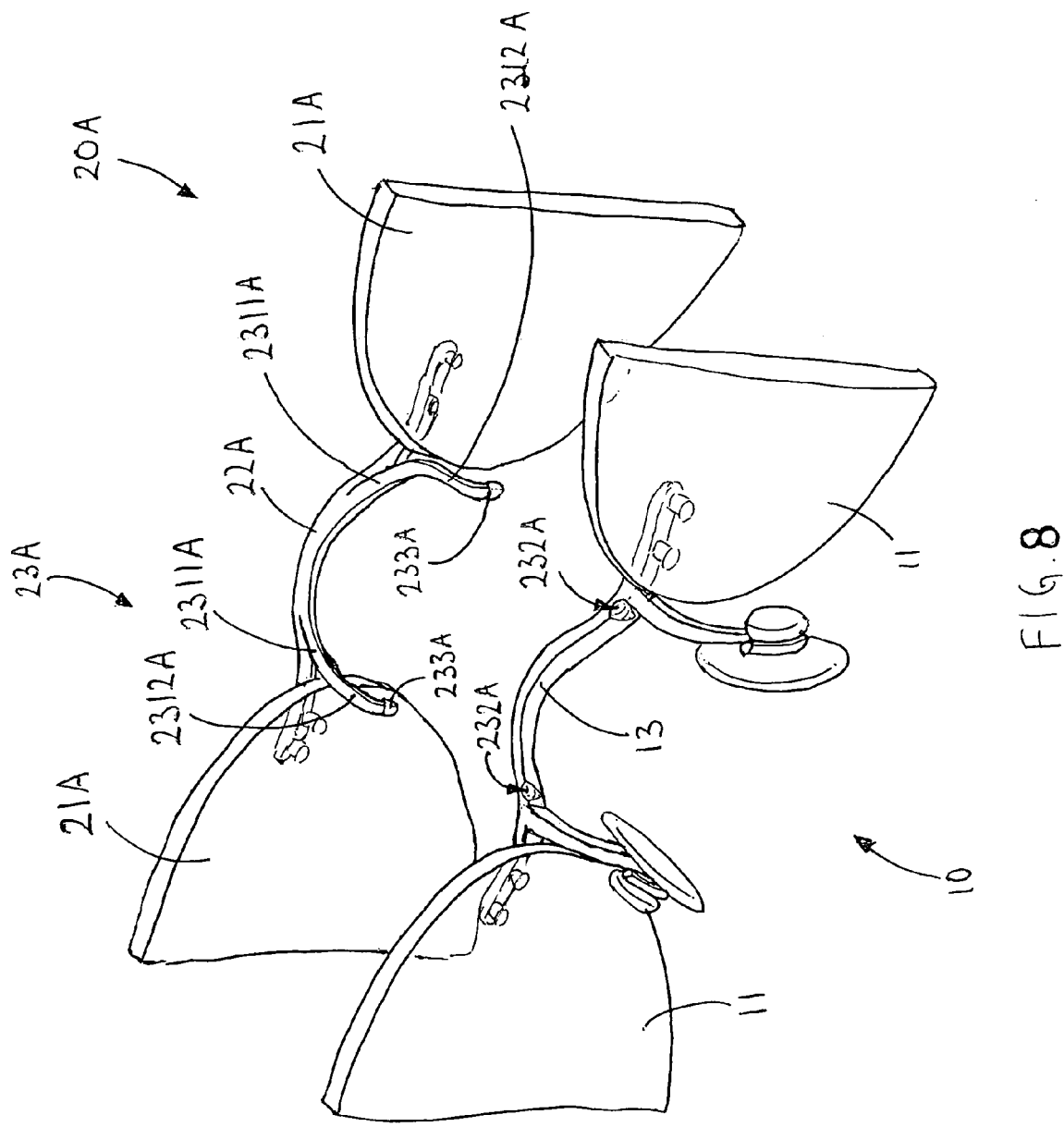
FIG. 8 illustrates a first alternative mode of the detachable shelter frame of the spectacle set according to the above preferred embodiment of the present invention.
Figure 9:
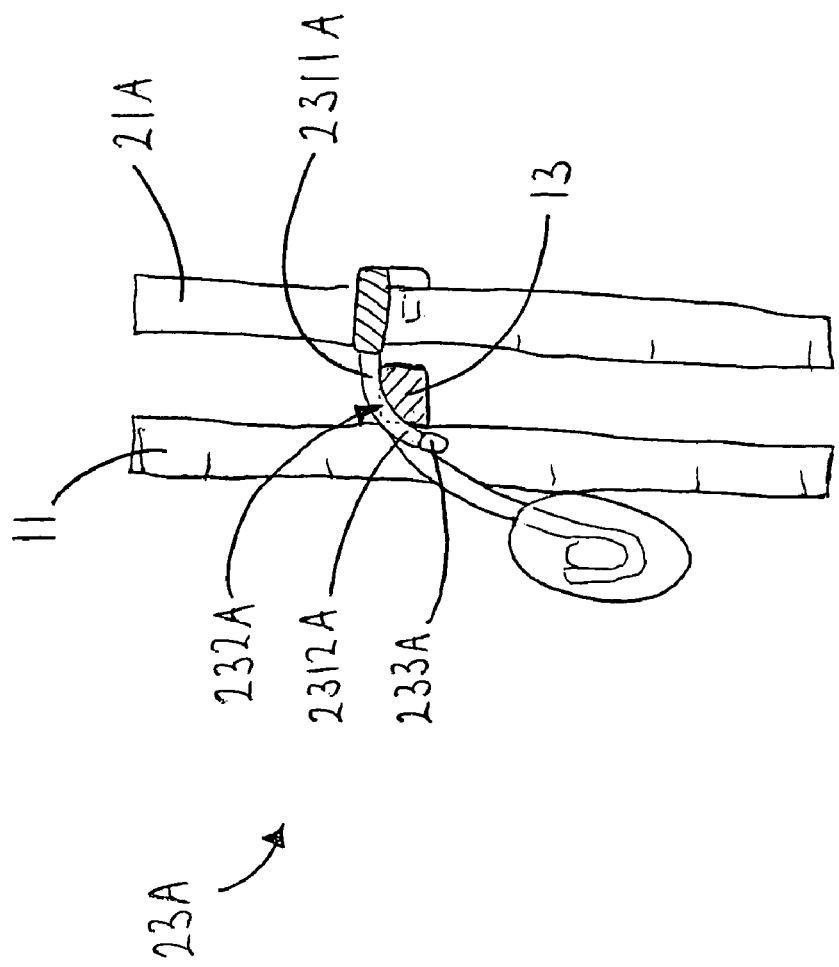
FIG. 9 is a perspective view of the first alternative mode of the spectacle set according to the above preferred embodiment of the present invention.

FIGS. 8 and 9 illustrate a first alternative mode of the detachable shelter frame 20A according to the preferred embodiment of the present invention. The detachable shelter frame 20A comprises a shelter bridge 22A supporting two shelter lenses 21A in position and a mounting arrangement 23A comprises two resilient arms 231A rearwardly extended from the shelter bridge 22A to ride on the primary bridge 13 so as to detachably mount the detachable shelter frame 20A in front of the primary spectacle 10.

As shown in FIG. 8, each of the resilient arms 231A, having a L-shaped, has a riding portion 2311A integrally and rearwardly extended from the shelter bridge 22A to ride on the primary bridge 13 and a holding portion 2312A downwardly extended from the riding portion 2311A to engage with a rear side of the primary spectacle 10 so as to securely hold the detachable shelter frame 20A in front of the primary spectacle 10. Therefore, when the resilient arms 231A are engaged with the primary bridge 13, each of the resilient arms 231A applies a clipping force against the primary bridge 13 so as to minimize a distance between the shelter lens 21A of the detachable shelter frame 20A and the lens 11 of the primary spectacle 10.

The mounting arrangement 23A further has two guiding grooves 232A spacedly formed on an inner side of the primary bridge 13 wherein the resilient arms 231AB are extended above the primary bridge 13 to align with the guiding grooves 232A respectively such that the resilient arms 231A are guided to mount on the primary bridge 13 at the guiding grooves 232A respectively, so as to securely mount the detachable shelter frame 20A in front of the primary spectacle 10, as shown in FIG. 9.

Accordingly, the riding portion 2311A of each of the resilient arms 231A is guided to slide along the respective guiding groove 232A to ensure the engagement of the resilient arm 231A with the primary bridge 13. As shown in FIG. 8, the riding portion 2311A of each of the resilient arms 231A is flattened to enhance the contacting surface of the riding portion 2311A of the resilient arm 231A with the primary bridge 13 along the guiding groove 232A so as to provide a simple clip-on arrangement of the detachable shelter frame 20A in front of the primary spectacle 10.

In addition, a scratch protector 233A is provided at the riding portion 2311A of each of the resilient arms 231A to prevent the resilient arm 231A from scratching the primary bridge 13 during the attachment operation. Accordingly, each of the scratch protectors 233A, which is made of EVA or silicon, forms as a tubular body for the riding portion 2311A of the resilient arm 231A to insert thereinto. Alternatively, the scratch protector 233A can be an anti-scratching layer coated on the riding portion 2311A of each of the resilient arm 231A.

Figure 10:
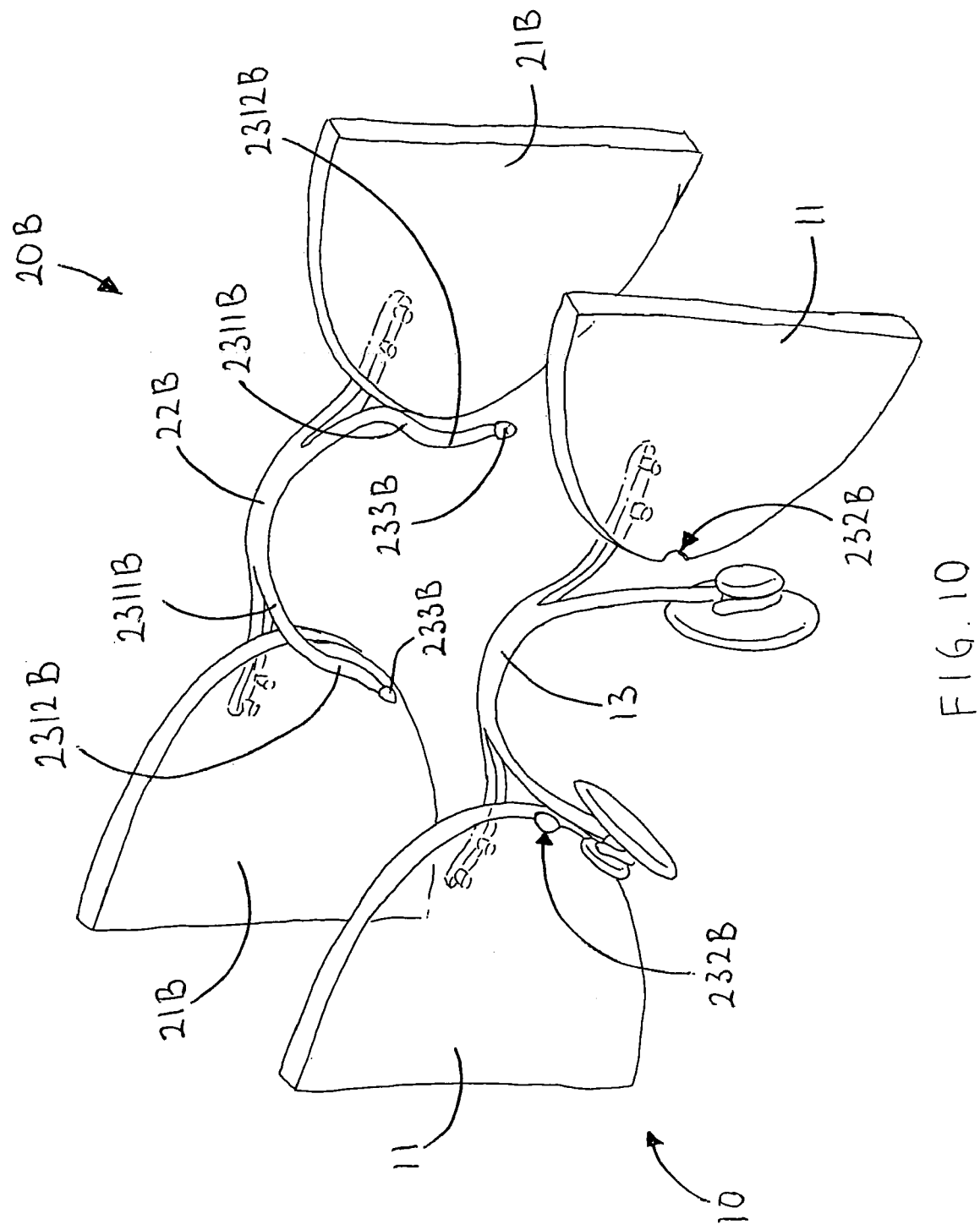
FIG. 10 illustrates a second alternative mode of the detachable shelter frame of the spectacle set according to the above preferred embodiment of the present invention.
Figure 11:
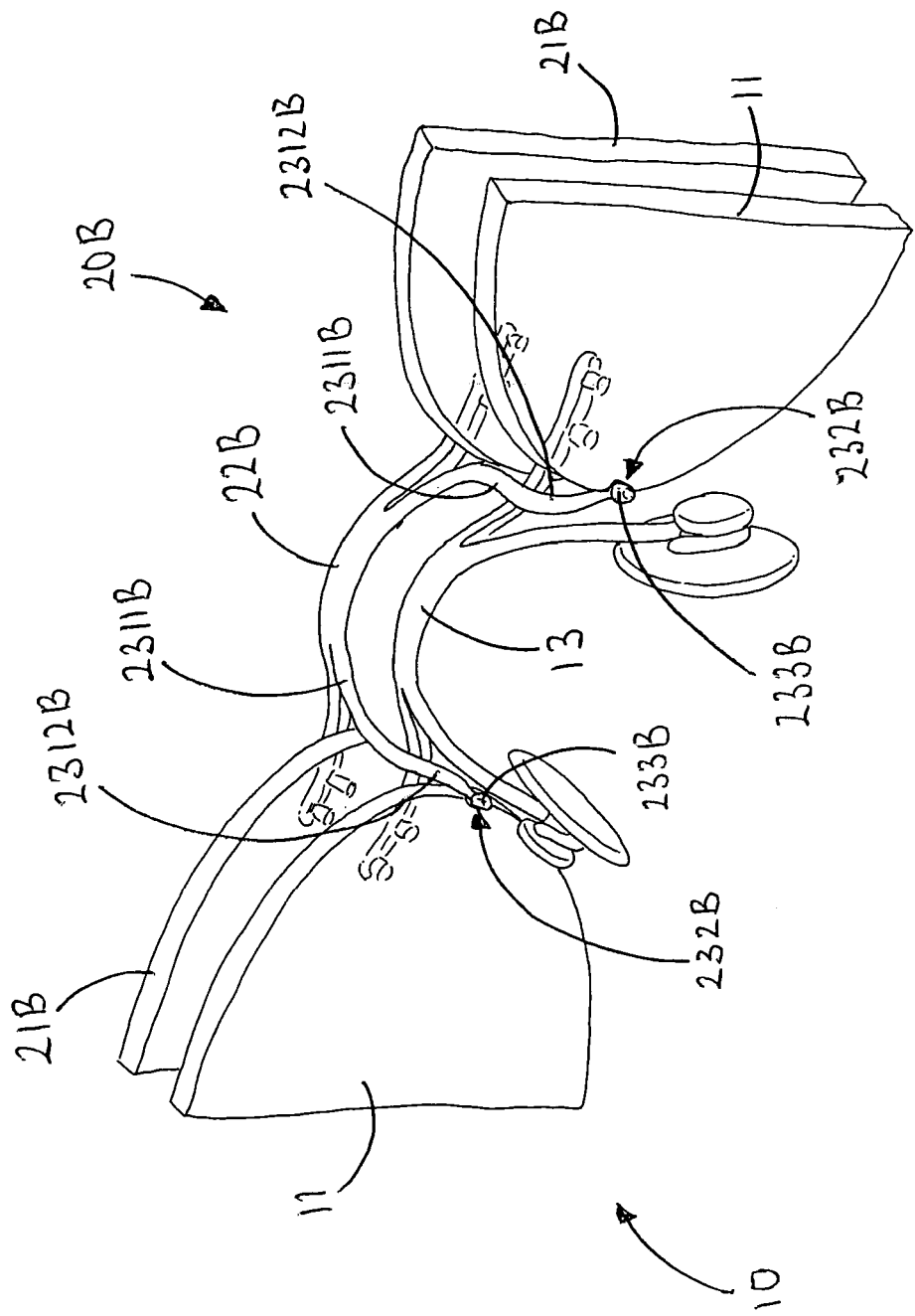
FIG. 11 is a perspective view of the second alternative mode of the spectacle set according to the above preferred embodiment of the present invention.

FIGS. 10 and 11 illustrate a second alternative mode of the detachable shelter frame 20B according to the preferred embodiment of the present invention. The detachable shelter frame 20A comprises a shelter bridge 22B supporting two shelter lenses 21B in position and a mounting arrangement 23B comprises two resilient arms 231B rearwardly extended from the shelter bridge 22B to ride on the primary bridge 13 so as to detachably mount the detachable shelter frame 20B in front of the primary spectacle 10.

As shown in FIG. 10, each of the resilient arms 231B, having a L-shaped, has a riding portion 2311B integrally and rearwardly extended from the shelter bridge 22B to ride on the primary bridge 13 and a holding portion 2312B downwardly extended from the riding portion 2311B to engage with a rear side of the primary spectacle 10 so as to securely hold the detachable shelter frame 20B in front of the primary spectacle 10. Therefore, when the resilient arms 231B are engaged with the primary spectacle 10, each of the resilient arms 231B applies a clipping force against the primary spectacle 10 so as to minimize a distance between the shelter lens 21B of the detachable shelter frame 20B and the lens 11 of the primary spectacle 10.

The mounting arrangement 23B further has two guiding grooves 232B formed at the inner sides of the lenses 11 of the primary spectacle 10 respectively wherein the resilient arms 231B are extended above the primary bridge 13 to align with the guiding grooves 232B respectively such that the resilient arms 231B are guided to mount on the primary bridge 13 at the guiding grooves 232B respectively, so as to securely mount the detachable shelter frame 20B in front of the primary spectacle 10, as shown in FIG. 11.

Each of the guiding grooves 232B is formed at a rear side of the respective lens 11 at a peripheral edge thereof wherein the guiding grooves 232B are formed on the lenses 11 respectively at a position below the primary bridge 13 such that when the resilient arms 231B ride on the primary bridge 13, the free ends of the resilient arms 231B are downwardly extended to engage with the guiding grooves 232B respectively.

Accordingly, each of the resilient arms 231B applies an outward clipping force against the primary spectacle 10 in such a manner that when the resilient arms 231B ride on the primary bridge 13, the resilient arms 231B are outwardly extended to bias against the inner sides of the lenses 11 towards the guiding grooves 232B respectively.

As shown in FIG. 10, the holding portion 2312B of each of the resilient arms 231B is extended to a position over the primary bridge 13 to engage with the respective guiding groove 232B to ensure the engagement of the resilient arm 231B with the primary spectacle 10. Accordingly, the holding portion 2312B of each of the resilient arms 231B is flattened to enhance the contacting surface of the holding portion 2312B of the resilient arm 231B with the guiding groove 232B so as to provide a simple clip-on arrangement of the detachable shelter frame 20B in front of the primary spectacle 10.

Furthermore, a scratch protector 233B is provided at the holding portion 2312B of each of the resilient arms 231B to prevent the resilient arm 231B from scratching the lens 11 during the attachment operation. Accordingly, each of the scratch protectors 233B, which is made of EVA or silicon, forms as a tubular body for holding portion 2312B of the resilient arm 231B to insert thereinto. Alternatively, the scratch protector 233B can be an anti-scratching layer coated on the holding portion 2312B of each of the resilient arm 231B.

Figure 12:
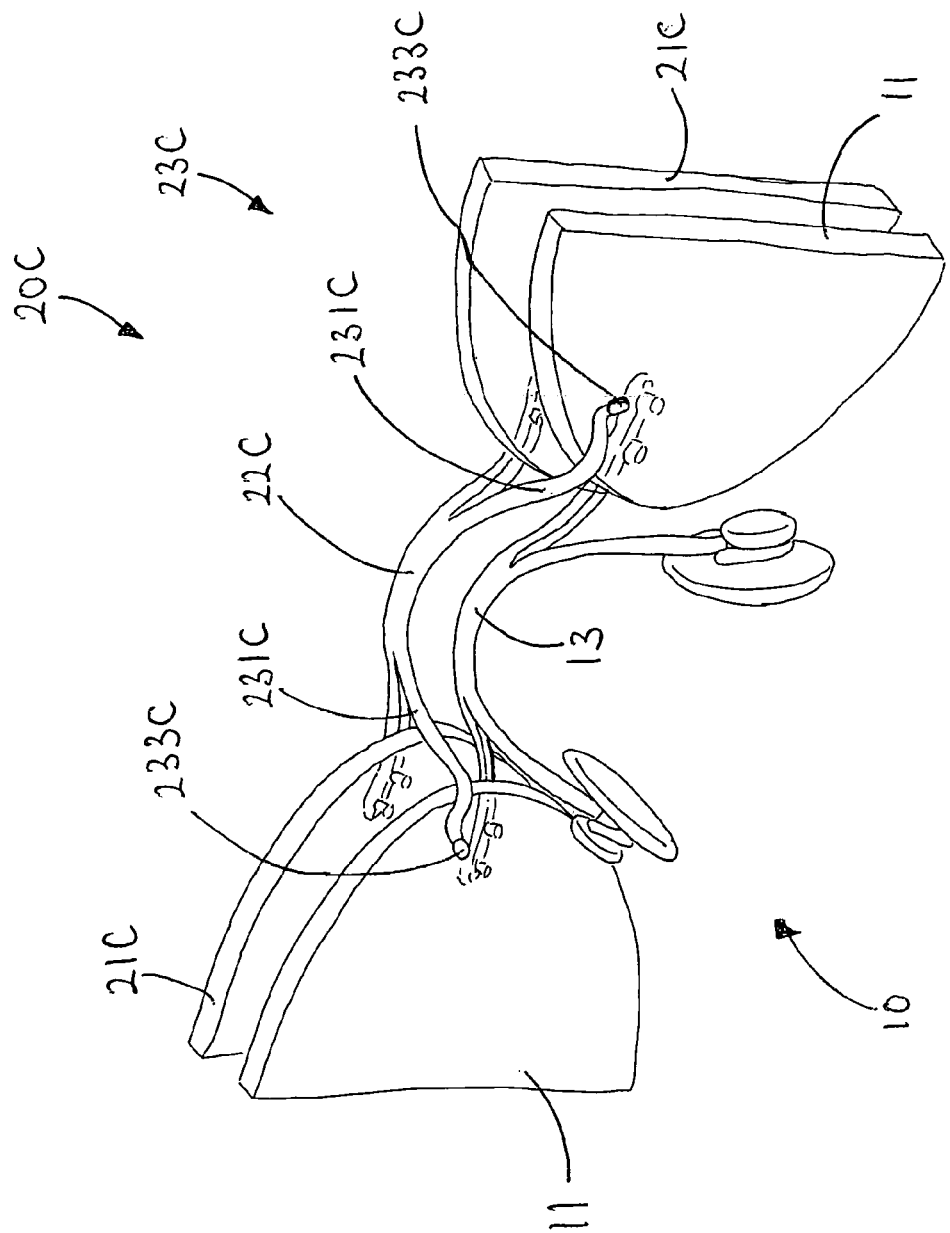
FIG. 12 illustrates a third alternative mode of the detachable shelter frame of the spectacle set according to the above preferred embodiment of the present invention.

FIG. 12 illustrates a third alternative mode of the detachable shelter frame 20C according to the preferred embodiment of the present invention. The detachable shelter frame 20C comprises a shelter bridge 22C supporting two shelter lenses 21C in position and a mounting arrangement 23C comprises two resilient arms 231C rearwardly extended from the shelter bridge 22C to engage with the primary spectacle 10 so as to detachably mount the detachable shelter frame 20C in front of the primary spectacle 10.

As shown in FIG. 12, each of the resilient arms 231C is integrally and rearwardly extended from the shelter bridge 22C to ride on the primary bridge 13 for applying a clipping force against the respective lens 11 of the primary spectacle 10, so as to securely mount the detachable shelter frame 20C in front of the primary spectacle 10.

Accordingly, free end portions of the resilient arms 231C are extended to rear sides of the lenses 11 respective to push the shelter lenses 21C towards the lenses 11 respectively so as to minimize a distance between the shelter lens 21C of the detachable shelter frame 20C and the lens 11 of the primary spectacle 10.

A scratch protector 233C is provided at the free end portion of each of the resilient arms 231C to prevent the resilient arm 231C from scratching the lens 11 during the attachment operation. Accordingly, each of the scratch protectors 233C, which is made of EVA or silicon, forms as a tubular body for the free end portion of the resilient arm 231C to insert thereinto. Alternatively, the scratch protector 233C can be an anti-scratching layer coated on the free end portion of each of the resilient arm 231C.

Figure 13:
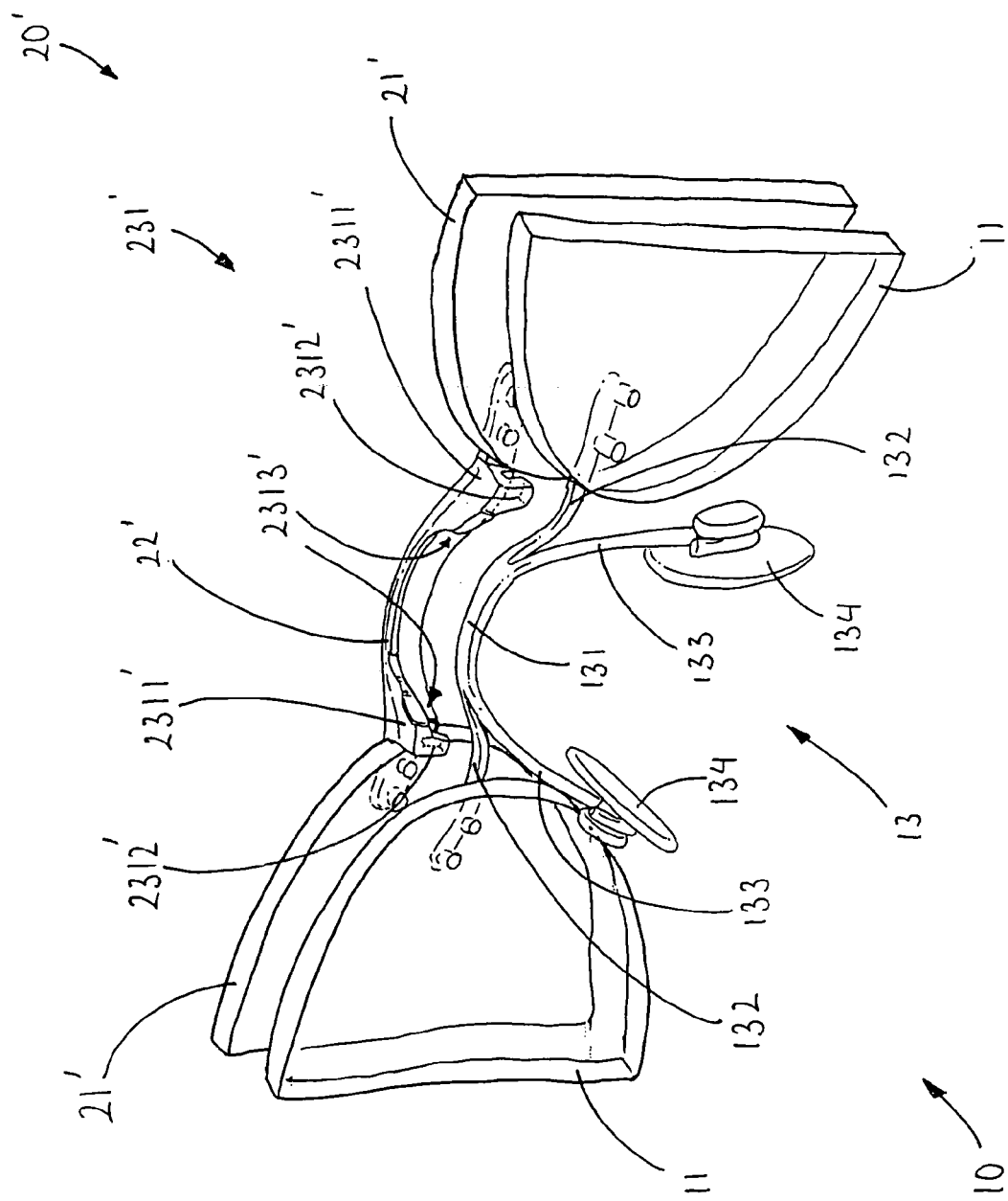
FIG. 13 illustrates a fourth alternative mode of the detachable shelter frame of the spectacle set according to the above preferred embodiment of the present invention.

FIG. 13 illustrates a fourth alternative mode of the detachable shelter frame 20' which comprises two shelter lenses 21', a shelter bridge 22' extended between two inner sides of the shelter lenses 21', and a mounting arrangement 23' rearwardly extended from the shelter bridge 22' to detachably mount on the primary bridge 13 so as to detachably mount the detachable shelter frame 20' in front of the primary spectacle 10.

The shelter bridge 22' comprises a plastic made elongated member having two ends fastened with the inner sides of the shelter lenses 21' respectively to form a rimless frame of the detachable shelter frame 20' and the mounting arms 231' are integrally and spacedly extended from the elongated member of the shelter bridge 22' to respectively engage with the lens holding arms 132 of the primary bridge 13 of the primary spectacle 10.

Each of the mounting arms 231', having a L-shaped, has a riding portion 2311' integrally and rearwardly extended from the shelter bridge 22' to ride on the respective lens holding arm 132 of the primary bridge 13 and a holding portion 2312' downwardly extended from the riding portion 2311' to engage with a rear side of the respective lens holding arm 132 of the primary bridge 13 so as to securely hold the detachable shelter frame 20' in front of the primary spectacle 10.

As shown in FIG. 4, each of the mounting arms 231' further has a mounting groove 2313' formed within the riding portion 2311' of the mounting arm 231', the holding portion 2312' of the mounting arm 231', and the shelter bridge 22', wherein the lens holding arms 132 are slidably received in the mounting grooves 2313' respectively, so as to securely mount the detachable shelter frame 20' in front of the primary spectacle 10.

Each mounting groove 2313' has a width slightly larger than a thickness of the lens holding arm 132 such that the lens holding arm 132 is fittingly received in the respective mounting groove 2313' to engage the mounting arm 231' with the primary bridge 13 so as to retain the detachable shelter frame 20' in front of the primary spectacle frame 10.

It is worth to mention that the mounting arrangement 23' is integrally extended from the shelter bridge 22' to form a one piece integral member wherein the shelter bridge 22' and the mounting arms 231' are made of lightweight but durable material such as plastic. Therefore, the overall weight of the detachable shelter frame 20' can be substantially reduced while the detachable shelter frame 20' can precisely mount in front of the primary spectacle 10.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A spectacle set, comprising:
a primary spectacle comprising two lenses and a weldingless primary bridge, wherein said primary bridge comprises a bridge body having two lens holding arms coupling with two inner sides of said lenses and two functioning arms integrally and rearwardly extended from said bridge body; and
a detachable shelter frame detachably mounting in front of said primary spectacle, wherein said shelter frame comprises two shelter lenses, a weldingless shelter bridge having two shelter lens holding arms coupling with two inner sides of said shelter lenses respectively and two resilient arms integrally and rearwardly extended from said shelter bridge to engage with said primary bridge so as to detachably mount said detachable shelter frame in front of said primary spectacle.

2. The spectacle set, as recited in claim 1, wherein said shelter bridge is formed in one integral body that said shelter lens holding arms and said resilient arms are spacedly and sidewardly extended to form said shelter bridge having a H-shaped cross section, wherein said resilient arms are rearwardly bent to ride on said primary bridge of said primary spectacle.

3. The spectacle set, as recited in claim 1, wherein each of said resilient arms, having a L-shaped, has a riding portion integrally and rearwardly extended from said shelter bridge to ride on said respective lens holding arm of said primary bridge and a holding portion downwardly extended from said riding portion to engage with a rear side of said respective lens holding arm of said primary bridge so as to securely hold said detachable shelter frame in front of said primary spectacle.

4. The spectacle set, as recited in claim 2, wherein each of said resilient arms, having a L-shaped, has a riding portion integrally and rearwardly extended from said shelter bridge to ride on said respective lens holding arm of said primary bridge and a holding portion downwardly extended from said riding portion to engage with a rear side of said respective lens holding arm of said primary bridge so as to securely hold said detachable shelter frame in front of said primary spectacle.

5. The spectacle set, as recited in claim 3, wherein said holding portion of each of said resilient arms has a guiding tip formed at a bottom end to guide said respective resilient arm to slidably engage with said lens holding arm of said primary bridge of said primary spectacle.

6. The spectacle set, as recited in claim 4, wherein said holding portion of each of said resilient arms has a guiding tip formed at a bottom end to guide said respective resilient arm to slidably engage with said lens holding arm of said primary bridge of said primary spectacle.

7. The spectacle set, as recited in claim 1, wherein each of said resilient arms, having a L-shaped, has a riding portion integrally and rearwardly extended from said shelter bridge to ride on said respective lens holding arm of said primary bridge and a holding portion downwardly extended from said riding portion at a position that said holding portions are engaged with two guiding grooves which are formed at a rear side of said primary spectacle so as to securely hold said detachable shelter frame in front of said primary spectacle.

8. The spectacle set, as recited in claim 2, wherein each of said resilient arms, having a L-shaped, has a riding portion integrally and rearwardly extended from said shelter bridge to ride on said respective lens holding arm of said primary bridge and a holding portion downwardly extended from said riding portion at a position that said holding portions are engaged two guiding grooves which are formed at a rear side of said primary spectacle so as to securely hold said detachable shelter frame in front of said primary spectacle.

9. The spectacle set, as recited in claim 7, wherein said two guiding grooves are spacedly formed on an inner side of said primary bridge, wherein said holding portions of said resilient arms are extended to engage with said guiding grooves respectively.

10. The spectacle set, as recited in claim 8, wherein said two guiding grooves are spacedly formed on an inner side of said primary bridge, wherein said holding portions of said resilient arms are extended to engage with said guiding grooves respectively.

11. The spectacle set, as recited in claim 7, wherein said two guiding grooves formed at two inner sides of said lenses, wherein said holding portions of said resilient arms are extended to engage with said guiding grooves respectively.

12. The spectacle set, as recited in claim 8, wherein said two guiding grooves formed at two inner sides of said lenses, wherein said holding portions of said resilient arms are extended to engage with said guiding grooves respectively.

13. The spectacle set, as recited in claim 1, wherein said two lenses holding arms of said primary bridge are fastened to said inner sides of said lenses respectively to form a rimless frame of said primary spectacle.

14. The spectacle set, as recited in claim 4, wherein said two lenses holding arms of said primary bridge are fastened to said inner sides of said lenses respectively to form a rimless frame of said primary spectacle.

15. The spectacle set, as recited in claim 10, wherein said two lenses holding arms of said primary bridge are fastened to said inner sides of said lenses respectively to form a rimless frame of said primary spectacle.

16. The spectacle set, as recited in claim 12, wherein said two lenses holding arms of said primary bridge are fastened to said inner sides of said lenses respectively to form a rimless frame of said primary spectacle.

* * * * *